Sept. 10, 1946.   W. S. MacRAE   2,407,430
TRUCK UNLOADING APPARATUS
Filed June 27, 1945   2 Sheets-Sheet 1

WALTER S. MacRAE
INVENTOR.

BY

Sept. 10, 1946.  W. S. MacRAE  2,407,430
TRUCK UNLOADING APPARATUS
Filed June 27, 1945  2 Sheets-Sheet 2

WALTER S. MacRAE
INVENTOR.

BY

Patented Sept. 10, 1946

2,407,430

UNITED STATES PATENT OFFICE 2,407,430

TRUCK UNLOADING APPARATUS

Walter S. MacRae, Castle Hot Springs, Ariz.

Application June 27, 1945, Serial No. 601,785

1 Claim. (Cl. 214—58)

This invention relates to improvements in unloading apparatus especially adapted for use on trucks, trailer trucks, and the like.

One of the principal objects of the invention is the provision of apparatus of this character which is of simple, efficient and durable construction and readily adaptable to various sizes of truck bodies for automatically discharging loads carried thereby, by simply moving the truck in a forward direction while the trailing end of the unloading apparatus is anchored to the ground or roadway or any other convenient point of anchorage rearwardly of the truck.

Figure 1:
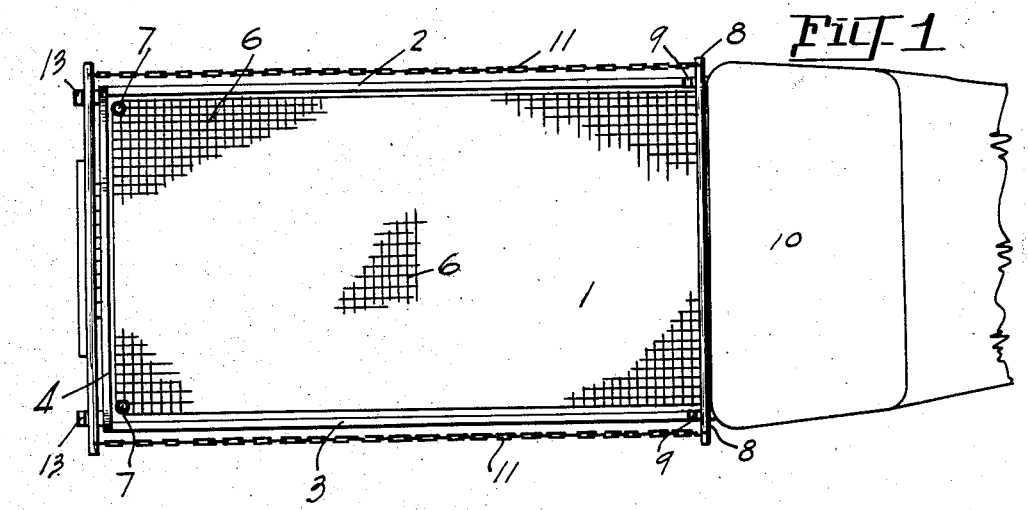
Figure 1 is a top plan view of a truck body provided with unloading apparatus made in accordance with my invention.

Referring now more particularly to the drawings:

The truck body shown is of any conventional design having a bottom wall 1, side walls 2 and 3, and a tail gate 4 hinged as at 5 in any approved manner to the trailing edge of bottom wall 1 of the truck body. The upper edge of the tail gate 4 is, of course, provided with any approved means (not shown) for securing the tail gate to the side walls in a closed position.

The forward end of the truck body may be provided with a front wall, if desired, or the back wall of the cab may serve that purpose.

The unloading apparatus consists of a flexible element 6 in the form of a screen, a mat, flexible sheet material, or the like, secured at its rearmost end to the bottom wall 1 of the truck by any suitable means such as bolts, indicated at 7. The unloading element is of sufficient length to cover the entire bottom wall of the truck body and to extend upwardly along the front wall thereof and terminate in a bar 8 normally supported by brackets 9 secured to the back wall of the cab 10 of the truck. The bar 8 is connected by a pair of chains 11 with a bar 12 disposed at the rear end of the truck and supported by the upper end of the tail gate 4 by brackets 13 attached thereto. Swingably attached to the bar 12 by means of bearings 14 is a yoke 15 whose lower end terminates in bearings 16 for pivotally mounting a spiked anchor 17, adapted to be swung downwardly and into engagement with the roadway or any other suitable point of anchorage. For limiting the outward swing of the anchor 17 with respect to the yoke 15, I form an adjustable limit stop in the form of a bolt 18 extending through the anchor and the yoke and provided with a head 19 at one of its ends and a nut 20 at its opposite end so that the amount of outward swing of the anchor may be regulated by the adjustment of the nut on the bolt. The anchor is free to swing inwardly into a collapsed position with respect to the yoke, due to the loose fit of the bolt through the yoke.

Figure 4:
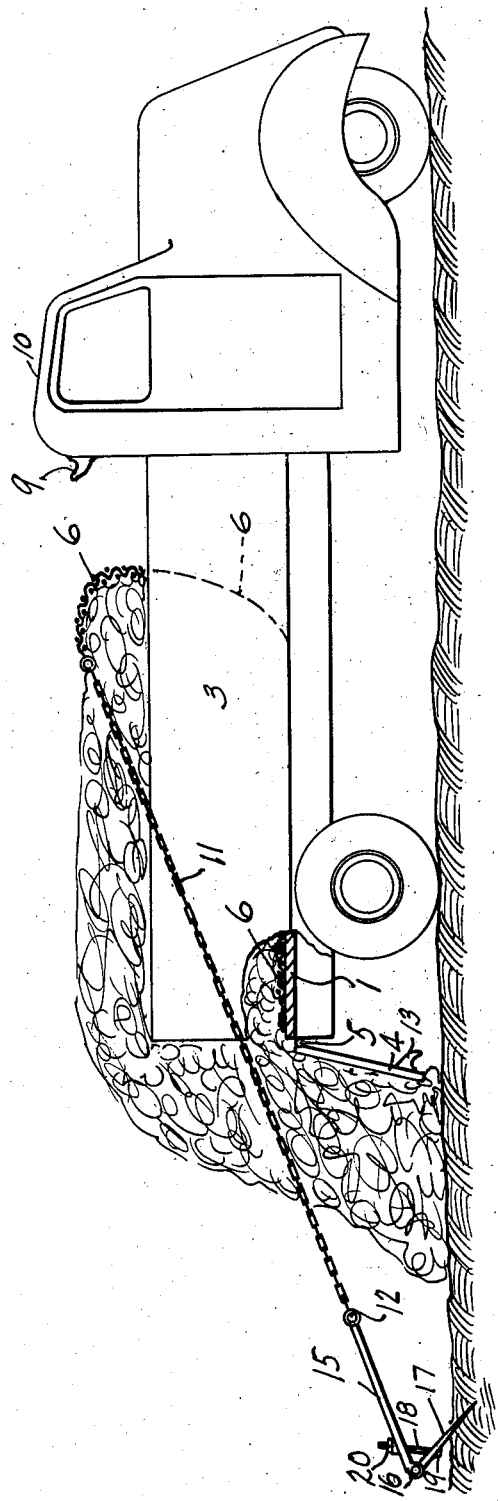
Figure 4 is a side elevation of the truck moving in a forward direction for automatically disposing of its load.

When the apparatus is in the position shown in Figure 2 and the flexible element 6 is disposed below and in front of the load in the truck body and it is desired to remove the load from the truck, the operator lifts the yoke 15 from its supporting brackets 13 and moves it rearwardly from the truck and swings the anchor down into engagement with the ground or roadway. Following this, the operator moves the truck forwardly, whereupon the anchor 17, through the medium of the chains 11, pulls the bar 8 from its brackets 9 and the flexible element 6 rearwardly to roll the load out of the rear end of the truck body as shown in Figure 4.

Figure 2:
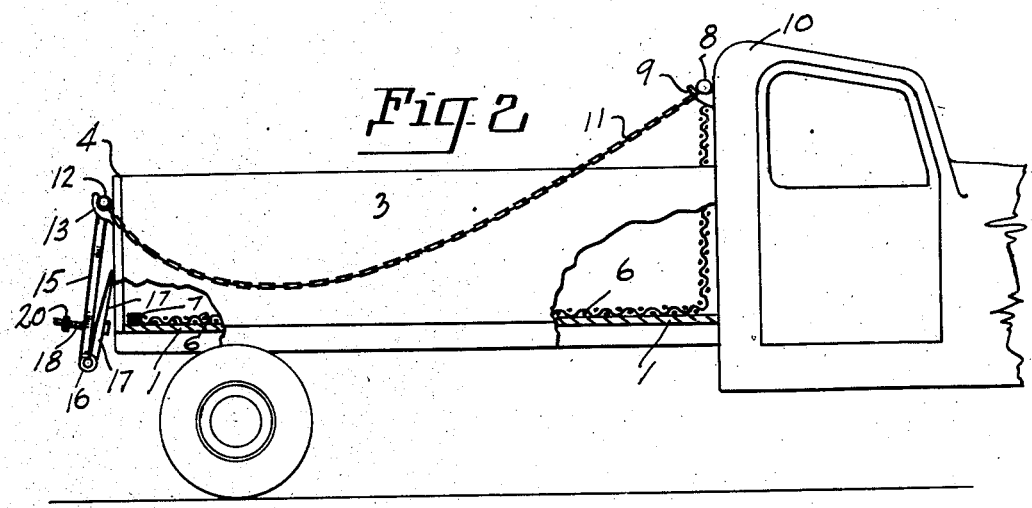
Figure 2 is a side elevation of Figure 1 with parts broken away for convenience of illustration and showing the unloading apparatus in position when loaded or ready to receive a load.
Figure 3:
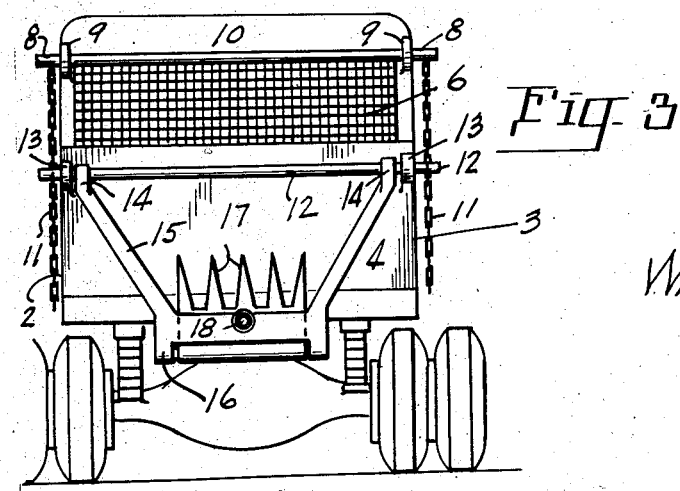
Figure 3 is a rear elevation of Figure 2.

After the load has been disposed of, the flexible element 6 is returned to the position shown in Figure 2, the bars 8 and 12 and the yoke and anchor are restored to their respective brackets 9 and 13, and the truck body is again ready to receive another load.

While I have shown a particular form of embodiment of my invention, I am aware that many minor changes therein will readily suggest themselves to others skilled in the art without departing from the spirit and scope of the invention.

Having thus described my invention, what I claim as new and desire to protect by Letters Patent is:

In apparatus for removing a load from a truck body, the combination of a flexible mat secured at one of its ends to the rear end of the bottom wall of the truck body and extending full length and width thereof, the forward end of the mat being connected with an anchor disposed rearwardly of the mat and adapted to draw the mat rearwardly as the truck moves forwardly, said anchor consisting of a plurality of tines swingably attached as a unit to one end of a bracket, and means extending through the tine unit and the bracket for limiting the swinging movement of the tines with respect of the bracket.

WALTER S. MacRAE.